Dec. 9, 1952         W. L. BERGER         2,620,534
ALTERNATING ACTUATOR FOR A PAIR OF FLEXIBLE CORDS
Filed April 17, 1950
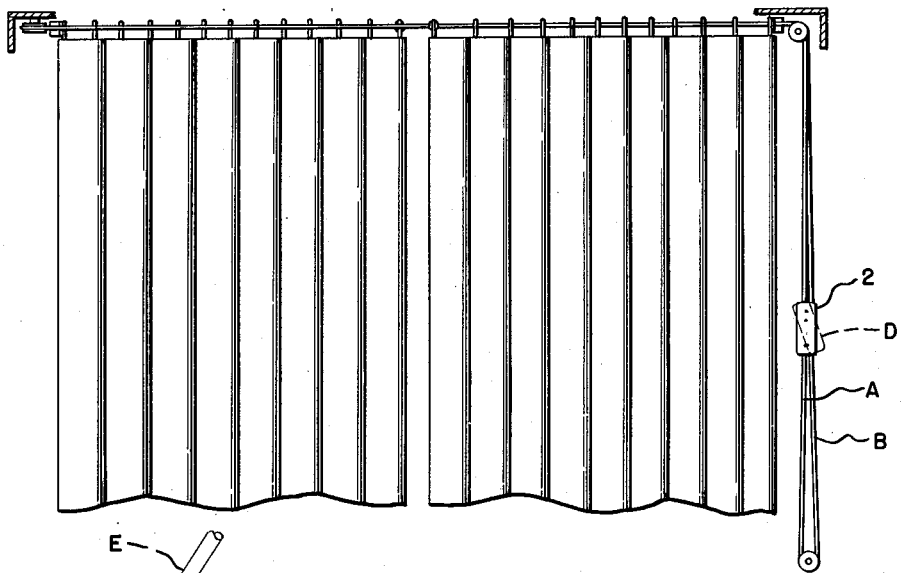
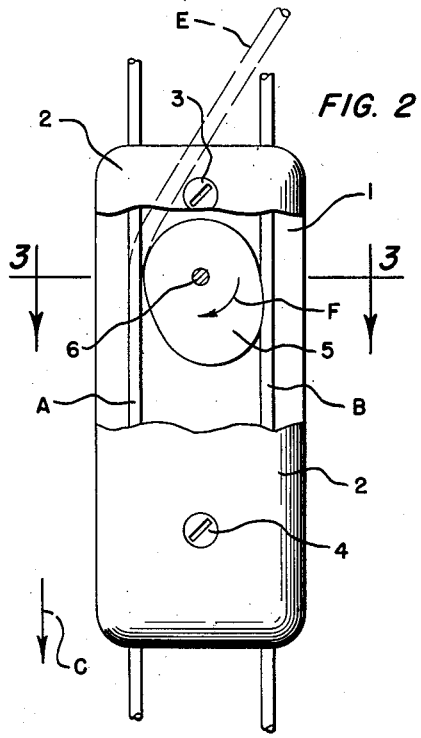
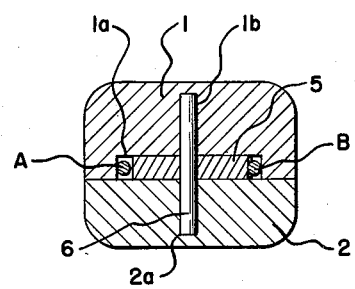
INVENTOR.
WILLIAM L. BERGER
BY
*Wm. H. Dean*
AGENT Patented Dec. 9, 1952

2,620,534

UNITED STATES PATENT OFFICE 2,620,534

ALTERNATING ACTUATOR FOR A PAIR OF FLEXIBLE CORDS

William L. Berger, National City, Calif.

Application April 17, 1950, Serial No. 156,457

2 Claims. (Cl. 24—134)

1

My invention relates to an alternating actuator for a pair of flexible cords, and the objects of my invention are:

First, to provide an actuator of this class which is particularly adapted for use in connection with the cords used to move large curtains or drapes, or the like;

Second, to provide an alternating actuator of this class which may be slightly tilted in one direction or the other, for disengaging one cord and engaging the other of a pair of cords, whereby said actuator may be used to move either of said cords, as desired;

Third, to provide an alternating actuator of this class in which a single moving part is pivotally mounted on a casing through which the cords pass on opposite sides of the moving part, providing a very simple structure which is compact, and which may be supported on a pair of cords to be actuated;

Fourth, to provide an alternating actuator of this class which assists in actuating cords connected to large heavy curtains or drapes, whereby the manual effort involved in opening or closing such curtains or drapes is greatly reduced;

Fifth, to provide an alternating actuator of this class which assists a person in selectively operating either of a pair of cords with one hand; and Sixth, to provide an alternating actuator for a pair of flexible cords which is very simple and economical of construction, efficient in operation, and which will not readily deteriorate or get out of order.

With these and other objects in view, as will appear hereinafter, my invention consists of certain novel features of construction, combination and arrangement of parts and portions, as will be hereinafter described in detail and particularly set forth in the appended claims, reference being had to the accompanying drawings and to the characters of reference thereon, forming a part of this application, in which:

Fig. 1 is a side elevational view of a pair of cords connected to large drapes, illustrating my alternating actuator for a pair of flexible cords on said cords; Fig. 2 is an enlarged side elevational view of my alternating actuator for a pair of flexible cords, showing a portion thereof broken away to amplify the illustration; and Fig. 3 is a sectional view, taken from the line 3—3 of Fig. 2.

Similar characters of reference refer to similar parts and portions throughout the several views of the drawings.

The casing members 1 and 2, screws 3 and 4, pivoted cord-engaging member 5, and the shaft 6, constitute the principal parts and portions of my alternating actuator for a pair of flexible cords.

In the construction of my alternating actuator for a pair of flexible cords, I have provided a pair of casing members 1 and 2, which are secured in connection with each other by means of the screws 3 and 4. The casing member 1 is provided with a U-shaped channel portion 1a therein, which is enclosed at its open side by means of the casing 2, as shown in Fig. 3 of the drawings. The shaft 6 extends into a recess 1b in the casing 1 at its one end, and extends into a recess 2a in the casing 2 at its other end. Pivotally supported on this shaft or stud 6 is the pivoted cord-engaging member 5, which is substantially eccentric, as shown in Fig. 2 of the drawings, but which may be varied in shape, as desired, without changing the general operation of said pivoted cord-engaging member 5. The cord engaging member 5 is oval shaped and is eccentrically mounted on said shaft 6 relative to the longitudinal axis of said oval shaped cord engaging member.

When installed in connection with the pair of cords individually referenced A and B in Fig. 1 of the drawings, the casing members 1 and 2 form a unitary handle structure for my alternating actuator for a pair of flexible cords, and also provide a support for the cord-engaging member 5, which retains said casing members 1 and 2 in certain fixed position on the cords A and B at all times. It will be noted that the cords A and B are disposed in the channel portion 1a at opposite edge portions of the pivoted cord-engaging member 5, as shown best in Figs. 2 and 3 of the drawings. It will be noted that the longitudinal axis of said cord engaging member is substantially parallel to the cords A and B.

The operation of my alternating actuator for a pair of flexible cords is substantially as follows:

As shown in Figs. 1 and 2 of the drawings, the pivoted cord-engaging member 5 is a substantially oval shaped member and is fully engaged with the cord B, which provides support for the casing members 1 and 2 on said cord B. Movement of the cord B may be accomplished in the direction as indicated by the arrow C in Fig. 2 of the drawings, by simply forcing the casing members 1 and 2 downwardly. When it is desired to move the cord A in the direction as indicated by the arrow C, the casing members 1 and 2 are pivoted into the dash line position D, as shown in Fig. 1 of the drawings, which causes the cord A to engage the pivoted cord-engaging member 5, as illustrated by dash lines E in Fig. 2 of the drawings. When such angular engagement of the cord A is accomplished, as shown by dash lines in Fig. 2 of the drawings, downward movement of the casings 1 and 2 causes the pivoted cord-engaging member 5 to rotate about the axis of the shaft 6 in the direction as indicated by the arrow F, all as shown best in Fig. 2 of the drawings. When the casings 1 and 2 are tilted as shown by dash lines in Fig. 1 the pivoted cord-engaging member 5 is angularly engaged by the cord A as shown by dash lines in Fig. 2 and it is caused to rotate in the direction as indicated by the arrow F, and it eccentrically engages the cord A and wedges the same against the inner side of the channel 1a in the casing 1. Thus, the cord A is positively frictionally engaged so that further downward movement of the casings 1 and 2 causes the cord A to be actuated in the same direction as indicated by the arrow C in Fig. 2 of the drawings. Consecutive pivotal movement of the casings 1 and 2 in the opposite direction, as indicated by the dash line position D in Fig. 1 of the drawings, will cause pivotal movement of the pivoted cord-engaging member 5 in the opposite direction as indicated by the arrow F when the casing members 1 and 2 are forced downwardly in the direction as indicated by the arrow C, whereupon the cord B will be consecutively engaged and will be wedged between the inner side wall of the channel 1a in the casing 1 and the eccentric edge of the pivoted cord-engaging member 5.

Thus, the general operation of my alternating actuator for a pair of flexible cords is the simple pivotal movement of the pivoted cord-engaging member 5 within the casing 1, caused by angular engagement of one of the cords therewith, for rotating the pivoted cord-engaging member into engagement with the respective cord for wedging the same within the channel of the casing 1, so that said cord will be positively engaged and movable by force applied to the casing members 1 and 2 in a certain direction.

Though I have shown and described a particular construction, combination and arrangement of parts and portions, I do not wish to be limited to this particular construction, combination and arrangement, but desire to include in the scope of my invention the construction, combination and arrangement substantially as set forth in the appended claims.

Having thus described my invention, what I claim as new and desire to secure by Letters Patent is:

1. In an alternating actuator for a pair of flexible cords of substantially the same size, a casing having a channel extending therethrough, a pivot element mounted to extend transversely through the channel, a cord clamping member mounted to swing about the axis of said pivot element and having its periphery shaped to form an upper portion concentric for approximately 180° about the pivot axis and an eccentric portion depending from and having its major axis greater than the radius of said concentric portion, said clamping member being disposed to provide corresponding cord passages between its periphery and the side walls of the channel of the casing whereby turning of the casing from its non-clamping position causes the eccentric portion of the clamping member to clamp either of the cords for selective adjustment of the cords.

2. An actuator as defined in claim 1 wherein said eccentric portion of the clamping member has a pendulum action tending to maintain the clamping member with its major axis in a vertical position and said pivot element is positioned centrally of the transverse dimension of the channel.

WILLIAM L. BERGER.

REFERENCES CITED

The following references are of record in the file of this patent:

UNITED STATES PATENTS

| Number | Name | Date |
|---|---|---|
| 790,691 | Lamp | May 23, 1905 |
| 1,140,820 | Hewitt | May 25, 1915 |
| 2,066,049 | Passek | Dec. 29, 1936 |

FOREIGN PATENTS

| Number | Country | Date |
|---|---|---|
| 1,878 | Great Britain | Feb. 11, 1885 |